March 9, 1937.  L. G. ROWAND  2,072,907

CONCENTRATION OF ORES BY ELECTROMAGNETIC SEPARATION

Filed Dec. 2, 1932  3 Sheets-Sheet 1

INVENTOR
LEWIS G. ROWAND.
BY
ATTORNEYS

March 9, 1937. L. G. ROWAND 2,072,907
CONCENTRATION OF ORES BY ELECTROMAGNETIC SEPARATION
Filed Dec. 2, 1932 3 Sheets-Sheet 2

INVENTOR
LEWIS G. ROWAND.
BY
ATTORNEYS

March 9, 1937.  L. G. ROWAND  2,072,907
CONCENTRATION OF ORES BY ELECTROMAGNETIC SEPARATION
Filed Dec. 2, 1932  3 Sheets-Sheet 3
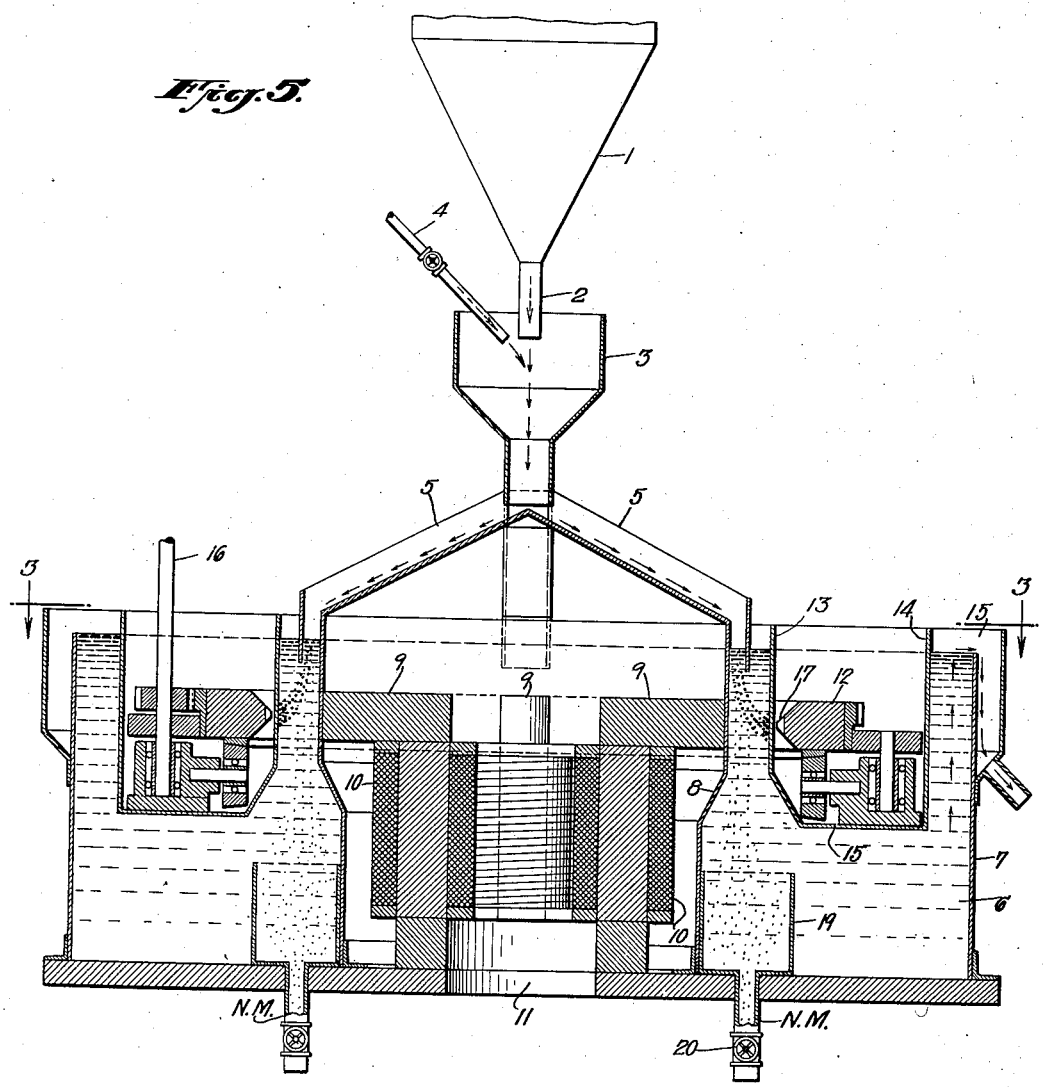
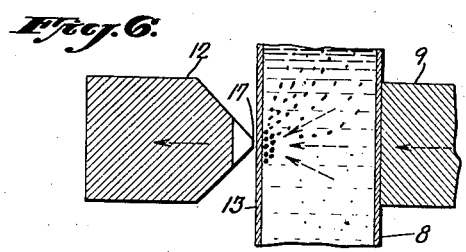
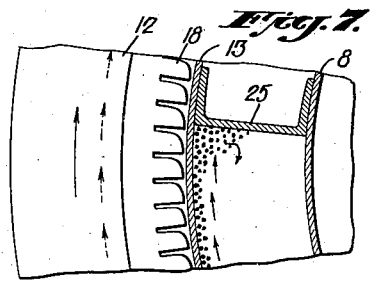
INVENTOR
LEWIS G. ROWAND.
BY
ATTORNEYS Patented Mar. 9, 1937

2,072,907

UNITED STATES PATENT OFFICE 2,072,907

CONCENTRATION OF ORES BY ELECTROMAGNETIC SEPARATION

Lewis G. Rowand, Brooklyn, N. Y.

Application December 2, 1932, Serial No. 645,459

9 Claims. (Cl. 209—221)

This invention relates to methods of concentrating ores, minerals, residues and the like by electromagnetic separation and also to apparatus designed to effect the same.

Heretofore in the art electromagnetic separation has been applied in the concentration of ores, minerals and the like and many types of apparatus have been devised to accomplish the same on both wet and dry ores. All such methods and apparatus heretofore devised have been characterized by certain operating inefficiencies which it is one of the objects of the present invention to eliminate.

Another object of the present invention is to provide a method and apparatus which is operable with equal facility with all types and grades of ores, minerals, residues and the like.

Another object of the present invention is to provide a method and apparatus which will yield a selective concentration of magnetic values with complex ores, minerals, residues and the like.

Still another object of the present invention is to provide a new method and new type of apparatus for the electromagnetic separation of materials.

Other objects and advantages will become apparent as the invention is more fully disclosed.

In accordance with the objects of the present invention I have devised an improved method of electromagnetically separating ores, minerals, residues and the like materials, in which the material is first ground to a particle size effective in separating the respective constituents thereof from each other, and then made into a suitable pulp or suspension in a fluid medium. The thus obtained pulp is then fed in any desired manner into a column of fluid within which it may be suitably dispersed and the thus dispersed particles are allowed to pass through an electromagnetic field projected across the fluid between two spaced walls of the container therefor.

By suitable adjustment of the field strength of the electromagnetic field any desired magnetic separation of the particles may thus be effected and the ore particles not magnetically separated will pass through the field and settle out in the bottom of the container. When the magnetic field is concentrated upon a restricted area of the container wall, the magnetically separated material will collect thereon. By a proper design of the electromagnet I have found that it is possible to laterally move the thus collected magnetic material along the container wall through the magnetic field towards a neutral point thereof whereby a selective release of the magnetically retained materials from the wall of the container can be effected. The thus released magnetic material thereupon settles down to the bottom of the container and can be collected in separate compartments from the portion of the material not magnetically separated.

As a specific embodiment of the practice of the present invention I have designed one type of apparatus suitable for the practice of the described method. Other types of apparatus may be designed, however, to effectuate the same result. In the apparatus designed I have provided a container wherein a substantially quiescent body of fluid may be retained with a portion of said fluid extending as a column between spaced pole faces and a laterally movable armature spaced a determined distance from the pole faces. Preferably the armature is rotatable laterally between the pole faces. Means are provided to feed the material in pulp form into the column of fluid in such manner that it passes through a magnetic field projected across the column of fluid between the pole faces and the armature. The armature face is designed so that the field flux concentration is at a plurality of points thereon. The magnetically attracted material collecting upon the container wall adjacent the armature face is laterally moved therealong by the lateral movement of the armature through the electromagnetic field until the flux density is insufficient to retain the material upon the face of the container wall. The material then is released and falls through the column of fluid into the body of fluid wherein it is collected in appropriate containers separate from the portion of the material that is not magnetically attracted.

Before further disclosing the nature and scope of the present invention reference should be made to the accompanying drawings, wherein—

Fig. 5 is a vertical cross-sectional elevation along plane 5—5, Fig. 3;

Fig. 6 is an enlarged sectional elevation of one of the features of the present invention;

Fig. 7 is an enlarged sectional plan view of the same.

Figure 1:
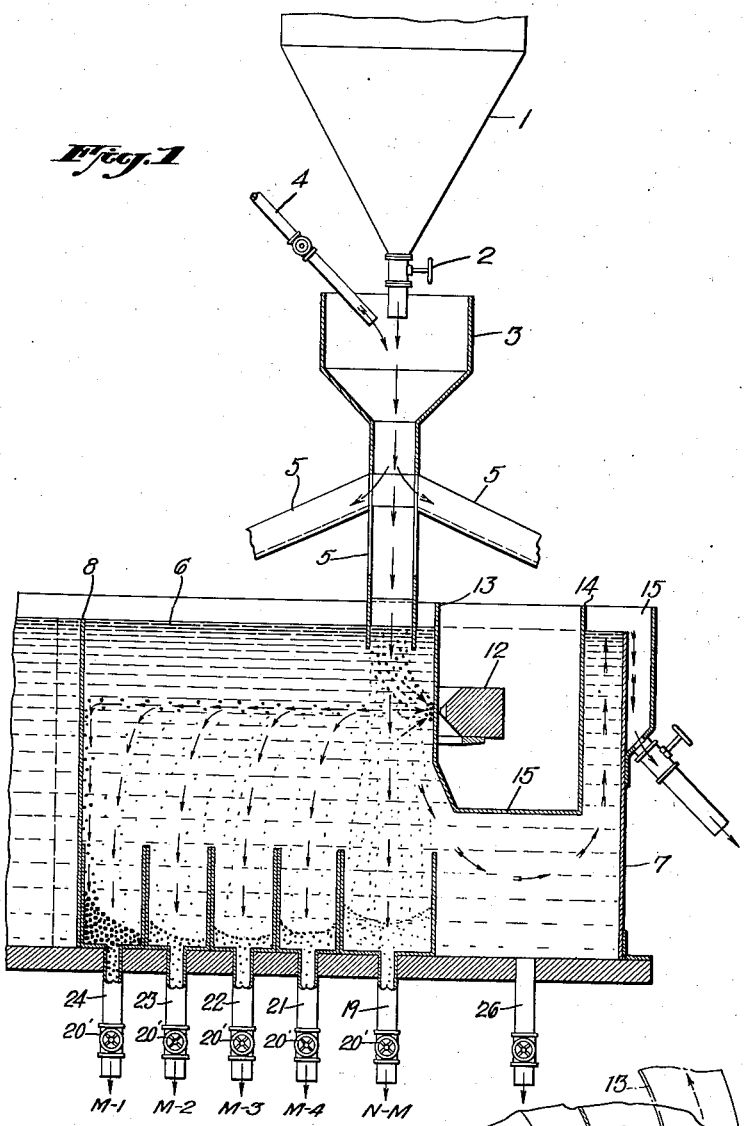
Fig. 1 is a sectional side elevation view illustrating the broad inventive idea of the present invention schematically.

Referring to the drawings, Fig. 1 illustrates schematically the operating characteristics of the broad inventive idea of the present invention, and the remaining figures indicate one type of apparatus I have designed to effectuate the present invention. While the broad idea is generally applicable to all types of ores, minerals, residues and the like which are susceptible to magnetic separation, for the purposes of illustration and not as a limitation I will describe the apparatus and the method as I have devised and adapted the same to the concentration of materials containing magnetic iron constituents such as hematite, magnetite and the like. The magnetite is the most susceptible to magnetic separation and the hematite is the least susceptible. As an example of the practice of the present invention, the method and apparatus designed to operate upon oxidized iron ores in which the iron exists as hematite ($Fe_2O_3$) and magnetite ($Fe_3O_4$) with non-magnetic gangue such as quartz, gneiss, schist, etc. or upon titaniferous iron ores containing magnetite, ilmenite with quartz, schist, gneiss and the like gangue materials will be described.

Figure 3:
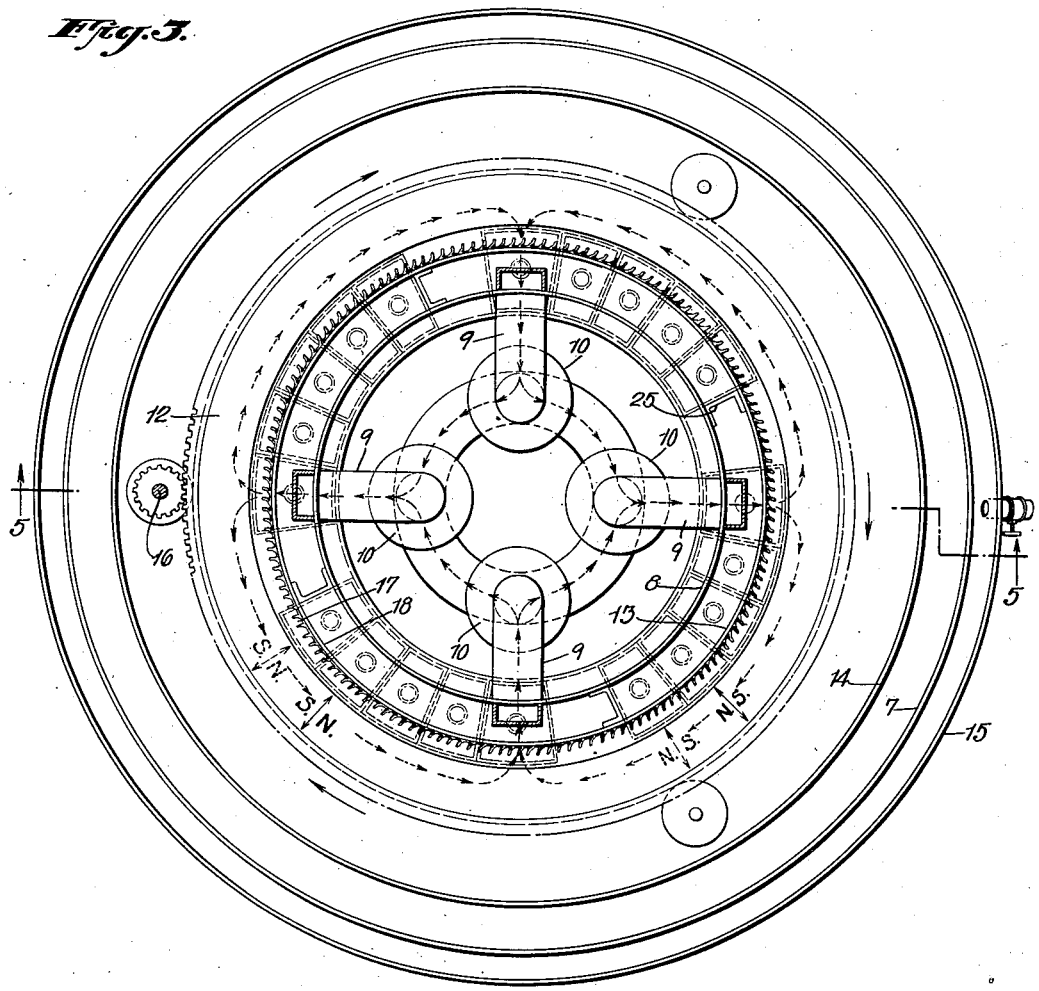
Fig. 3 is a plan view partly in section along plane 3—3 of Fig. 5 of one type of apparatus designed to effectuate the present invention.
Figure 4:
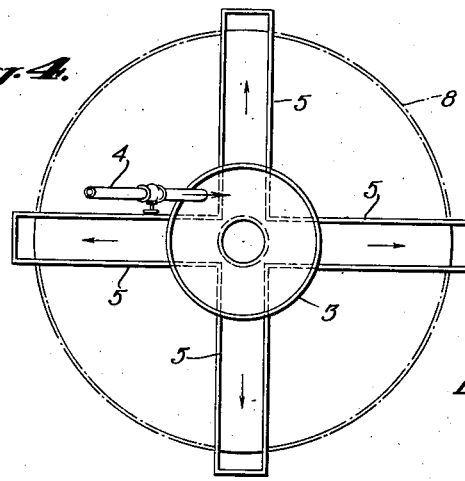
Fig. 4 is a top view of the hopper and feed means of the same.

The ore is first ground to desired particle size adapted to substantially free the magnetic constitutents from the gangue or non-magnetic constituents. This grinding may be done wet or dry. The ore then may be screened or classified as desired to relatively uniform particle sizes and made up into a pulp or suspension of any convenient or desired density and supplied in any convenient manner to hopper 1. From hopper 1 the ore pulp is passed by valve 2 into feed funnel 3 wherein it is admixed and further diluted with water or other suitable fluids as will hereinafter be defined before passing into a plurality of feed chutes 5 serving to carry the suspended ore particles to the quiescent body of fluid 6 retained in container 7. Container 7 is preferably circular in shape as indicated in Figs. 3 and 5 and has an inner wall 8 concentric with the outer wall of the container 7 thus forming a core within which is disposed the electromagnet poles 9 and core windings 10 with a central opening 11 for air cooling. The faces of the poles 9 are positioned adjacent the core face of inner wall 8 of container 7 at a distance below the surface of the body of quiescent fluid 6. The plurality of chutes 5 are identical in number to the number of poles 9 and are positioned above the container 7 to bring the discharge outlet at a point vertically above the said pole faces so that in falling through the column of fluid retained between walls 8 and 13 the ore particles must pass by the pole face.

A circular armature 12 is positioned in spaced relationship to the face of poles 9 in a container having a side wall 13 closely contacting with the face of the armature and an outer side wall 14 spaced from the outer wall of container 7 to provide for an overflow 15 substantially as indicated. The bottom 15 of the armature container is spaced from the bottom of the container 7 to provide for a relatively large body of substantially quiescent fluid. Means 16 is provided to rotate the armature in a plane transverse to the direction of fall at any desired speed. Poles 9 are substantially fixed and immovable except for adjustment. The inner face of armature 12 is pointed substantially as shown at 17 to concentrate the magnetic flux thereon and is provided with a plurality of vertical grooves to form teeth 18 to form points of flux concentration thereon. The walls of fluid container 7 and armature container 13 are preferably composed entirely of non-magnetic material, but the part of the container which lies within the magnetic field only is necessary to be non-magnetic.

As indicated in Fig. 5 as the ore particles fall substantially vertically down through the column of fluid between walls 8 and 13 the magnetic constituents thereof are drawn over to the container wall 13 adjacent the face 17 of armature 12 by the magnetic force of an electromagnetic current circulating between the poles 9 and armature 12. The strength of this field is adjusted with respect to the precise spacing between the pole face and the armature and the magnetic susceptibility of the ore constituents it is desired to separate. In the separating of hematite and magnetite from a single ore or admixture, when the spacing of the pole face and armature face approximates one-half inch, the field strength should approximate the minimum strength necessary to attract magnetically the hematite. This field strength can be varied somewhat with respect to the particle size of the hematite and magnetite, and with the relative proportions of hematite and magnetite in the ore, and with respect to the lateral distance it is desired to carry the hematite by rotation of the armature. This field strength also can be varied with respect to the magnetic permeabilities of the specific ores being treated.

After the magnetic materials are removed the non-magnetic materials continue to fall vertically into container 19 from which they may be removed through valve 20 as and when desired.

I have found. for example, that a field strength sufficient to effect the separation of lowly magnetic hematite will be obtained by providing sufficient cross-sectional area in the core proportionate to the cross-sectional area in the pole and a sufficient winding of the coil to give approximately 1000 ampere turns per square inch area of the core.

Upon a rotation of the armature 12 the magnetic material retained upon wall 13 is carried laterally a distance determined by the magnetic susceptibility and by the decreasing strength of the magnetic field as the armature rotates between the poles. When the field strength lessens to such an extent that the material can no longer be retained upon the container wall, it drops off as is indicated in Fig. 1. By the provision of suitable hoppers 21 to 24 inclusive circumferentially disposed within container 7 as indicated in Figs. 1 and 2, the falling magnetic material may be selectively collected into portions graded with respect to their relative magnetic susceptibilities.

Figure 2:
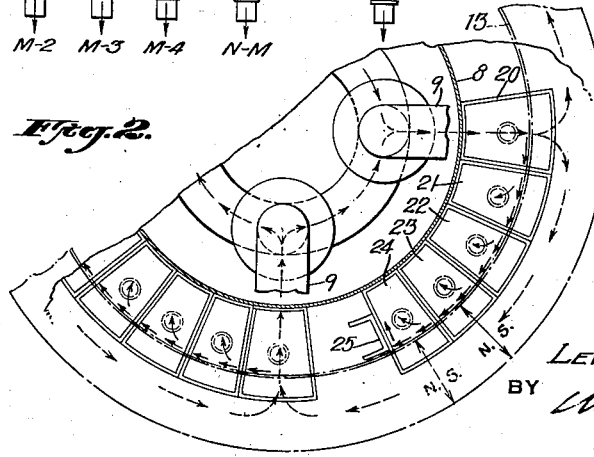
Fig. 2 is a sectional semi-schematic plan view of the same.

Referring to Fig. 2 the operation of this selective separation of magnetic materials may be readily recognized. The faces of poles 9—9 lie adjacent the container wall 8 and the face of armature 12 lies adjacent the container wall 13. An electromagnetic flux passes between the poles and the armature substantially as indicated by arrows. The point of greatest field strength is on the face of the armature 12 opposite the face of each pole and the strength of the field decreases in either direction towards the adjacent pole until at point N.—S. a neutral point is reached. At this point no magnetic material will be retained upon the face of wall 13.

When the armature is rotated the magnetic material attracted to the face of the wall 13 at a point opposite pole face 9 will follow the rotation of the armature due to the effects of the points of flux concentration produced by reason of teeth 18 (Fig. 7) and as the material is passed progressively into areas of decreasing field strength when the field strength is not great enough to hold the material to the face of the wall 13 it will fall off and fall vertically down into appropriate hoppers 21 to 24 inclusive. The exact position of central point N.—S. will vary with respect to the speed of rotation of armature 12 and as it is desirable to prevent the velocity of the magnetic material from carrying the released material circumferentially over into the field of the succeeding magnet a baffle plate 25 is disposed substantially as shown to prevent the same. This baffle can be made adjustable if desired.

In the separation of hematite and magnetite from ore residues and the like, the hematite will be released first and be collected in one of the hoppers 21 to 23, depending upon the precise field strength conditions, and the magnetite having a magnetic susceptibility many times that of hematite will ordinarily not be released until it has been carried to nearly the neutral point and accordingly will be collected in the last hopper 24. From these hoppers the materials may be withdrawn as and when desired by valves 20'.

In some types of ores the hematite and magnetite may be so closely associated as not to be completely freed from each other on grinding. Accordingly, middlings composed of admixtures of such unseparated particles will be obtained in one of the containers between 21 and 24.

In the specific embodiment herein shown, I have indicated four magnets. Instead of four magnets, I may employ only two or any multiple of two as desired or as the size of the apparatus warrants.

In the preparation of a pulp or suspension, with some types of ores it may be necessary to preferentially grind or to classify the ground ore into suspensions of certain particle size ranges for optimum results. It may also be necessary to add to such suspensions colloid dispersion agents such as sodium silicate, etc. With some types of ores and residues it may also be necessary to precondition the suspension by the addition thereto of dispersing agents such as acid or alkali to beneficiate the settling properties of the ore particles in the quiescent body of fluid 6.

It is contemplated within the scope of the present invention that the quiescent body of fluid 6 shall be comprised substantially of water. To facilitate the gravitational fall of ore particles through the body of fluid, however, it is also contemplated that the specific gravity of the water may be increased or decreased by the addition thereto of other fluids, salts or chemical compounds. Thus for example, for the purposes of the present invention I may use sea water, or artificial salt water, or I may add calcium chloride, or various sulfate or alum compounds to the water for the purpose of changing the specific gravity of the quiescent body of fluid 6. In such case the overflow from 15 can be carried to a reservoir for conditioning and return to circuit, if desired, through diluting feed pipe 4. It is also contemplated that a continuous bottom discharge of fluid may be necessary in conjunction with overflow 15 to maintain optimum conditions in the device. Such bottom discharge means is indicated at 26.

It is also contemplated within the scope of the present invention that the viscosity of the quiescent body of fluid may be modified by controlling the temperature thereof in any convenient manner.

There are other features disclosed which may be widely varied without departing essentially from the nature and scope of the present invention. It is preferable that chutes 5 should conduct the pulp or suspension to the quiescent body of fluid 6 substantially in the manner shown so that the bulk of the falling ore particles pass relatively close to the face of the container wall 10 adjacent the pole face to provide for relatively clean separation of the magnetic constituents. Suitable baffle plates, sieves, screens, etc. may be employed to facilitate this feature.

It is also contemplated that the pole faces of poles 9 and the adjacent container wall 8 may be shaped to provide an inclined surface over which the falling ore particles may slide gravitationally through the electromagnetic field. This arrangement will provide with any given spacing of poles 9 and armature 12 a varying field strength for the ore particles to pass through, thereby providing for a selective magnetic separation within the field. In this arrangement of elements the armature 12 should be provided with a plurality of points of flux concentration 17 positioned one above the other to facilitate the selective magnetic separation.

In the embodiment shown poles 9 and armature 12 are arbitrarily set a fixed distance apart, and with this arrangement the magnetic separation is controlled by varying the strength of the magnetic field therebetween. The exact spacing therebetween may be variable depending upon contemplated service conditions and it is contemplated within the scope of the present invention that armature 12 and container 13 therefor may be made as replaceable units, so that armatures of greater or lesser diameter may be employed thereby varying the spacing between the pole face and the armature. While I have shown the armature movable and rotatable about the outer circumference of the apparatus it is apparent that it would involve no departure to reverse the poles and the armature and to rotate the armature about the inner wall of the container 7.

Having broadly and specifically defined the present invention and the apparatus designed to effectuate the same, it is believed apparent that many modifications and departures may be made from the specific embodiment described herein without departing essentially from the nature and scope of the present invention as may be expressed and included within the following claims.

What I claim is:

1. Apparatus for the separation of materials comprising in combination, a container, a plurality of open compartments in the bottom of said container, at least one pair of electromagnetic poles disposed in spaced relationship in a horizontal plane adjacent the outer face of one wall of said container, a movable armature disposed in substantially the same horizontal plane adjacent the outer face of the opposite wall of said container, fluid filling said container, means to feed said material to the surface of said fluid immediately above the space gaps between said poles and armature, means to move said armature in a horizontal plane from one pole towards the other, and means to maintain the fluid level in said container substantially constant.

2. Apparatus for the magnetic separation of materials including in combination, a vertical hollow cylindrical container, the bottom of said container being divided into a plurality of separate compartments having valved outlet openings therein, fluid filling said container, at least one pair of electromagnetic poles of opposite polarity disposed adjacent the outer face of one wall of said container, said poles being disposed in spaced relationship in substantially the same horizontal plane, a rotatable armature adjacent the outer face of the opposite wall of said container in substantially the same horizontal plane, means to feed said material to the surface of said fluid immediately above the space gaps between said poles and said armature, and means to maintain a substantially constant fluid level in said container.

3. Apparatus for the magnetic separation of materials including in combination, a vertical hollow cylindrical container, the bottom of said container being divided into a plurality of separate compartments having valved outlet openings therein, fluid filling said container, a plurality of pairs of electromagnetic poles of opposite polarity disposed adjacent the outer face of one wall of said container, said poles being disposed in spaced relationship in substantially the same horizontal plane, a rotatable armature adjacent the outer face of the opposite wall of said container in substantially the same horizontal plane, means to feed said material to the surface of said fluid immediately above the space gaps between said poles and said armature, and means to maintain a substantially constant fluid level in said container.

4. Apparatus for the magnetic separation of materials including in combination, a vertical hollow cylindrical container, the bottom of said container being divided into a plurality of separate compartments having valved outlet openings therein, fluid filling said container, at least one pair of electromagnetic poles of opposite polarity disposed adjacent the outer face of one wall of said container, said poles being disposed in spaced relationship in substantially the same horizontal plane, a rotatable armature adjacent the outer face of the opposite wall of said container in substantially the same horizontal plane, means to feed said material to the surface of said fluid immediately above the space gaps between said poles and said armature, and means to maintain a substantially constant fluid level in said container and means to establish a magnetic field of desired intensity between said poles and armature.

5. Apparatus for the magnetic separation of materials including in combination, a vertical hollow cylindrical container, the bottom of said container being divided into a plurality of separate compartments having valved outlet openings therein, fluid filling said container, at least one pair of electromagnetic poles of opposite polarity disposed adjacent the outer face of one wall of said container, said poles being disposed in spaced relationship in substantially the same horizontal plane, a rotatable armature adjcent the outer face of the opposite wall of said container in substantially the same horizontal plane, means to feed said material to the surface of said fluid immediately above the space gaps between said poles and said armature, and means to maintain a substantially constant fluid level in said container, and means to establish a magnetic field of desired intensity between said poles and armature, and means to concentrate the lines of force of said field upon a plurality of points upon said armature.

6. The method of magnetically separating materials which comprises dropping said material through a column of fluid sustained in a stationary receptacle enclosing the space gap between a horizontally movable armature and a stationary electro-magnetic pole, thereby attracting the magnetical particles of said material to the inner face of a wall of said receptacle next adjacent the said armature and horizontally moving the same therealong to a point removed from the path of fall of the non-magnetic particles of said material.

7. The method of magnetically separating materials which comprises forming a suspension of said materials, incorporating therein a proportion of a reagent facilitating the segregation of magnetic from non-magnetic particles, dropping said material through a column of fluid sustained in a stationary receptacle enclosing the space gap between a horizontally movable armature and a stationary electro-magnetic pole, thereby attracting the magnetic particles of said material to the inner face of a wall of said receptacle next adjacent the said armature and horizontally moving the same therealong to a point removed from the path of fall of the non-magnetic particles of said material.

8. An electro-magnetic separator device comprising at least one pair of electro-magnetic poles disposed in horizontal spaced relation, an armature horizontally movable disposed in horizontal bridging relation to said poles with a space gap therebetween, a stationary receptacle containing a fluid enclosing the said space gap, the side walls of said receptacle lying adjacent the faces of said armature and said poles, and means to drop a mixture of magnetic and non-magnetic particles through the said enclosed space gap whereby the said magnetic particles are separated from the non-magnetic by being attracted to the inner face of the said wall next adjacent the said movable armature and carried horizontally therealong by movement of the said armature to a point removed from the path of fall of the said non-magnetic particles.

9. An electro-magnetic separator device comprising at least one pair of horizontally spaced electro-magnetic poles of opposite polarity, an armature movable horizontally and horizontally spaced from said poles, a stationary receptacle containing a fluid disposed in the space gap between said poles and said armature and isolating the same from said fluid and means to drop material comprising a mixture of magnetic and non-magnetic particles through the said fluid within an electro-magnetic field passing between at least one of said poles and said armature, thereby attracting the said magnetic particles to the inner face of the wall of said receptacle next adjacent the said armature and moving the same horizontally therealong out of the said magnetic field to a point removed from the path of fall of said non-magnetic particles.

LEWIS G. ROWAND.